United States Patent [19]
Manning et al.

[11] Patent Number: 5,909,427
[45] Date of Patent: Jun. 1, 1999

[54] REDUNDANT SWITCH SYSTEM AND METHOD OF OPERATION

[75] Inventors: Thomas A. Manning, Northboro; Stephen A. Caldara, Sudbury; Stephen A. Hauser, Burlington, all of Mass.

[73] Assignees: Fujitsu Network Communications, Inc., Richardson, Tex.; Fujitsu Limited, Kawasaki, Japan

[21] Appl. No.: 08/683,793

[22] Filed: Jul. 18, 1996

Related U.S. Application Data

[60] Provisional application No. 60/001,498, Jul. 19, 1995.

[51] Int. Cl.$^6$ ............... H04J 3/14; H04L 12/56
[52] U.S. Cl. ............... 370/219; 370/244
[58] Field of Search ............... 370/216, 218, 370/219, 220, 244, 242, 250, 386, 387, 388, 389, 395; 395/181, 182.01, 182.02, 185.01

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,485,467 | 11/1984 | Miles et al. | 370/220 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |

(List continued on next page.)

FOREIGN PATENT DOCUMENTS 484943 3/1992 Japan .

OTHER PUBLICATIONS

An Ascom Timeplex White Paper, Meeting Critical Requirements with Scalable Enterprise Networking Solutions Based on a Unified ATM Foundation, pp. 1–12, Apr. 1994—Apr. 1995?.

Douglas H. Hunt, ATM Traffic Management—Another Perspective, Business Communications Review, Jul. 1994.

Richard Bubenik et al., Leaf Initiated Join Extensions, Technical Committee, Signalling Subworking Group, ATM Forum/94–0325R1, Jul. 1, 1994.

Douglas H. Hunt et al., Flow Controlled Virtual Connections Proposal for ATM Traffic Management (Revision R2), Traffic Management Subworking Group, ATM Forum/94–0632R2, Aug. 1994.

Flavio Bonomi et al., The Rate–Based Flow Control Framework for the Available Bit Rate ATM Service, IEEE Network, Mar./Apr. 1995, pp. 25–39.

(List continued on next page.)

*Primary Examiner*—Alpus H. Hsu
*Attorney, Agent, or Firm*—Weingarten, Schurgin, Gagnebin & Hayes LLP

[57] ABSTRACT

A redundant switch (50) is provided for performing a switch fabric test. The redundant switch (50) includes a foreground switch fabric controller (24) for controlling a foreground switch fabric (26), a background switch fabric controller (124) for controlling a background switch fabric (126), and a first I/O module (14) in communication with the foreground switch fabric controller (24). The first I/O module (14) sends, at the request of the foreground switch fabric controller (24), a test cell to an input of the background switch fabric (126) and receives the test cell from a corresponding output of the background switch fabric (126). The first I/O module (14) determines if an error occurred and provides an error signal to the foreground switch fabric controller (24) in response if an error occurred. The foreground switch fabric controller (24) may log the error signal or enable an alarm or indicator in response.

38 Claims, 3 Drawing Sheets

U.S. PATENT DOCUMENTS

| | | | |
|---|---|---|---|
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,072,447 | 12/1991 | Perloff et al. | 371/20.1 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,345,438 | 9/1994 | Ozaki | 370/220 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |

| | | | |
|---|---|---|---|
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/219 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/601 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,609 | 10/1995 | Pepper | 370/218 |
| 5,461,611 | 10/1995 | Drake, Jr. et al. | 370/54 |
| 5,463,620 | 10/1995 | Sriram | 370/60 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,519,700 | 5/1996 | Punj | 370/418 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

R. Jain, Myths About Congestion Management in High Speed Networks, Internetworking Research and Experience, vol. 3, 101–113 (1992).

Douglas H. Hunt et al., Credit–Based FCVC Proposal for ATM Traffic Management (Revision R1), ATM Forum Technical Committee Traffic Management Subworking Group, ATM_Forum/94–0168R1, Apr. 28, 1994.

Douglas H. Hunt et al., Action Item Status for Credit–Based FCVC Proposal, ATM Forum Technical Committee Traffic Management Subworking Group, ATM_Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

Rob Coltun et al., PRP: A P–NNI Routing Protocol Proposal, ATM Forum Technical Committee, ATM_Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signaling Protocol, ATM Forum Technical Committee, Signalling Subworking Group, ATM Forum 94–1078, Jan. 1, 1994.

H.T. Kung and K. Chang, Receiver–Oriented Adaptive Buffer Allocation in Credit–Based Flow Control for ATM Networks, Proceedings of INFOCOM '95, Apr. 2–6, 1995, pp. 1–14.

H.T. Kung et al., Credit–Based Flow Control for ATM Networks: Credit Update Protocol, Adaptive Credit Allocation, and Statistical Multiplexing, Proceedings of ACM SIGCOMM '94 Symposium on Communications Architectures, Protocols and Applications, Aug. 31–Sep. 2, 1994, pp. 1–14.

SITA, ATM RFP: C–Overall Technical Requirements, Sep. 1994.

Hosein F. Badran et al., Head of Line Arbitration in ATM Switches with Input–Output Buffering and Backpressure Control, Globecom, pp. 347–351, 1991.

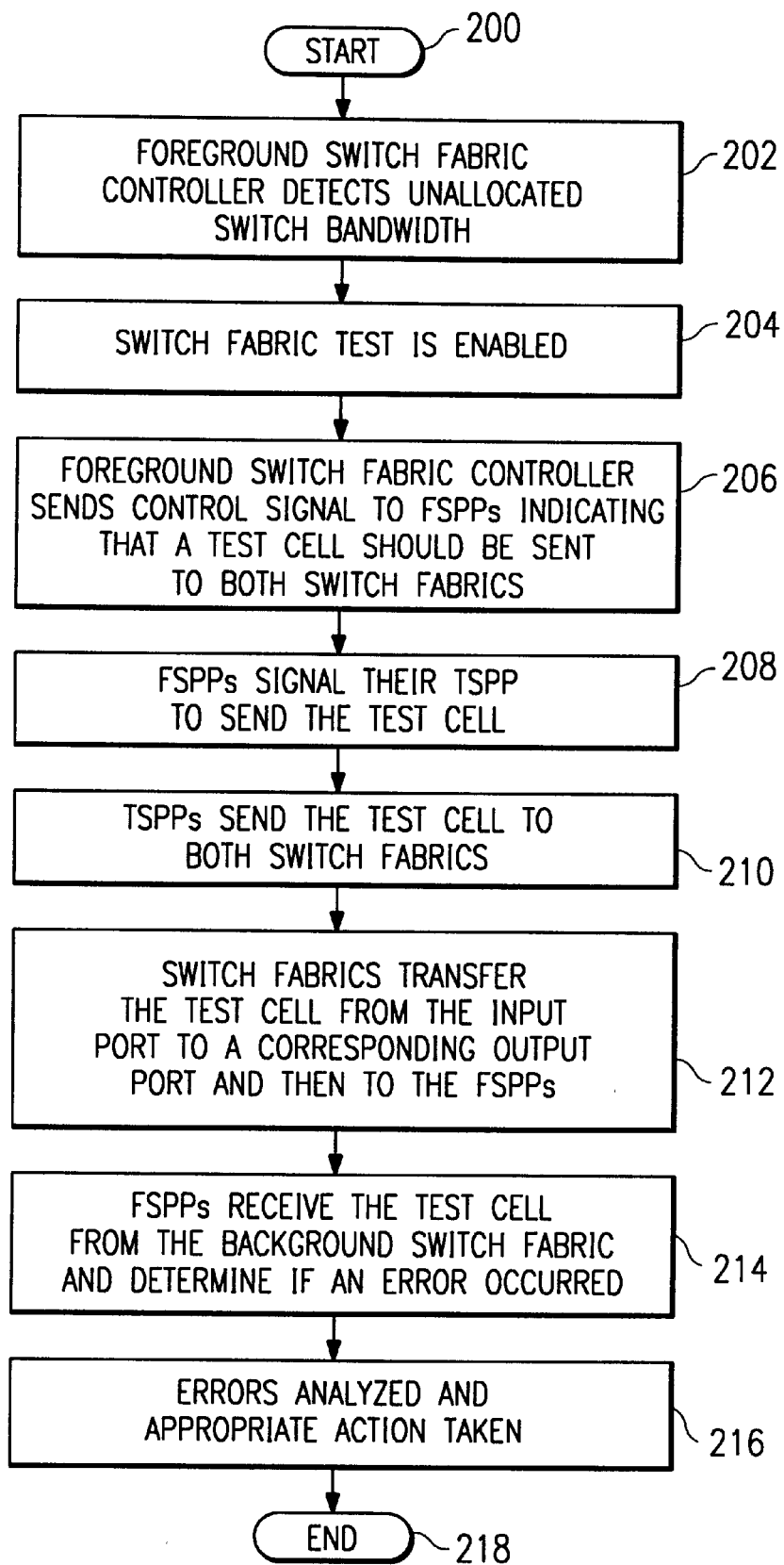

REDUNDANT SWITCH SYSTEM AND METHOD OF OPERATION

RELATED APPLICATIONS

This application claims benefit of U.S. Provisional Application Ser. No. 60/001,498, filed Jul. 19, 1995.

TECHNICAL FIELD OF THE INVENTION

The present invention relates generally to communication switching systems, and more specifically to a redundant switch system and method of operation.

BACKGROUND OF THE INVENTION

Usage and demand for modern communication systems continues to soar as users demand more and more sophisticated communication services and bandwidth while relying on the instant availability of these communication systems. Increasingly, communication systems are used to provide all types of information including voice, video, and data.

Modern communication systems include a collection of components, such as digital switching systems, that communicate, manipulate, and process information in a variety of ways. Digital switching systems are integral components of today's modern communication systems. The availability of communication systems is directly related to the availability of the digital switching systems used in these communication systems. As reliance on communication systems continues to increase, the availability of the digital switching systems used in these communications systems becomes critically important.

Problems arise when attempting to increase the availability of a digital switching system. The digital switching system may provide redundant capability so that if a circuit or module of the digital switching system fails, a backup circuit or module may be used. Problems arise when transitioning from a system or circuit operating in the foreground to a system or circuit operating in the background. Performance suffers greatly when the transition causes delays, interruptions in service, and errors. Often, when a circuit or module fails, the backup circuit is not properly initialized or operating correctly resulting in data loss or complete system failure. Also, overall system performance suffers when system resources are consumed attempting to verify that a backup circuit or module is operating correctly so that the backup circuit or module may be relied upon in the event of a failure.

SUMMARY OF THE INVENTION

In accordance with the present invention, a redundant switch system and method of operation are provided which substantially eliminate or reduce the disadvantages and problems associated with increasing the availability and reliability of a digital switching system. The present invention provides a redundant switch system and ensures that the background switch is available and operating correctly while minimizing or eliminating any adverse effects on actual switching operation.

According to an embodiment of the present invention, a redundant switch system is provided that includes a first switch control module, a second switch control module, and a first I/O module. The first switch control module includes a first switch fabric operating in the foreground under the control of a first switch fabric controller. The first switch fabric receives communication signals from an input port and provides the communication signals to at least one of its output ports. The first switch fabric controller may initiate a switch fabric test. The second switch control module includes a second switch fabric operating in the background and under the control of a second switch fabric controller. The second switch fabric receives communication signals at an input port and provides the communication signals to at least one of its output ports. The first I/O module exchanges communication signals with the first switch fabric and the second switch fabric. The I/O module provides a test communication signal to an input of both switch fabrics in response to the initiation of a switch fabric test by the first switch fabric controller. The I/O module then receives the test communication signal from an output of the second switch fabric and generates or provides an error signal if an error is detected in the received test communication signal.

The redundant switch and method of operation provides various technical advantages. A technical advantage of the present invention includes increased switch availability. Another technical advantage includes the ability to systematically and routinely check the operation of a background switch during actual switch operation to ensure that the background switch is operating correctly while minimizing or eliminating any adverse effect on overall switch performance. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 3 is a flowchart illustrating a method for operating the redundant switch system.

DETAILED DESCRIPTION OF THE INVENTION

Figure 1:
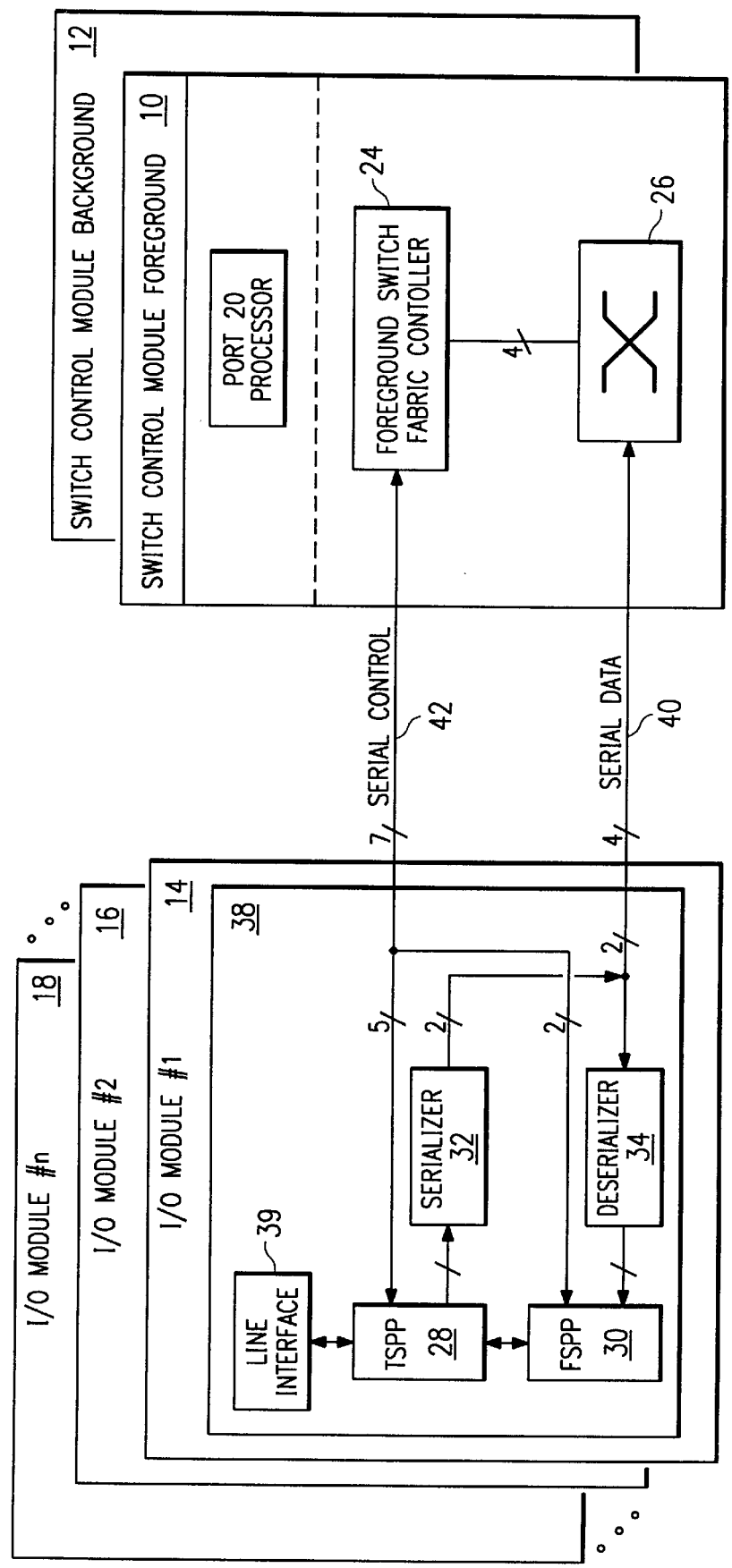
FIG. 1 is an overview block diagram illustrating a control and a data interconnection between a first I/O module and a foreground switch control module.

FIG. 1 is an overview block diagram of a control and a data interconnection between a first I/O module 14 and a foreground switch control module 10 of a digital communication switch. Also shown in FIG. 1 are a plurality of additional I/O modules represented by a second I/O module 16 and an $n^{th}$ I/O module 18. Each of the plurality of I/O modules interconnect with foreground switch control module 10 in the same manner that first I/O module 14 couples to foreground switch control module 10. A background switch control module 12 is also provided which interconnects to each of the plurality of I/O modules in the same manner that foreground switch control module 10 interconnects to each of these plurality of I/O modules. Background switch control module 12 operates in the background and serves as a redundant module in the event that foreground switch control module 10 fails or is taken out of service.

In operation, the plurality of I/O modules receive information, such as voice, video, and data, from a corresponding communications link using a variety of access technologies. Each I/O module provide this information to the inputs of a foreground switch fabric 26 of foreground switch control module 10 and background switch control module 12. Foreground switch control module 10, using a foreground switch fabric controller 24 and any available switching scheme, controls the switching of foreground switch fabric 26 so that the communication information provided by each I/O module is properly routed or mapped to the appropriate destination I/O module. Foreground switch control module 10 receives control information from the various I/O modules to assist with carrying out the switching scheme.

First I/O module 14 is representative of the plurality of I/O modules and includes a line interface 39 and a cell flow processor 38. In one embodiment, line interface 39 includes a connectivity engine, a network interworking, and a physical interface to exchange information with a particular type of access technology provided by the communication link or network that is coupled to line interface 39. This coupling is not shown in FIG. 1.

Each of the plurality of I/O modules occupies a particular port in the digital communication switch. Each of the plurality of I/O modules are similar, except for the line interface which allows a particular I/O module to interface with a particular access technology. The access technology may include virtually any communications format or protocol such as asynchronous transfer mode (ATM), cell relay, frame relay, circuit emulation, LAN emulation, internetworking, and the like, and using virtually any physical medium or transmission hierarchy. Line interface 39 may support any suitable communication technique, whether connection-based or connectionless. Thus, first I/O module 14 may interface, through line interface 39, with a communication link that supports a particular access technology, while the line interfaces of other I/O modules may support different access technologies. In this manner, information may be received by an I/O module in a particular format, converted to a common or core cell format used in foreground switch control module 10 by the line interface, routed to a destination I/O module through foreground switch control module 10, and finally provided to the communication link coupled to the destination I/o module that uses a completely different access technology than the source communication link.

Cell flow processor 38 provides an interface between line interface 39 and foreground switch control module 10. Cell flow processor 38 interconnects with foreground switch control module 10 using a first I/O serial data signal 40 and a first I/O serial control signal 42. In one embodiment, these may be provided as eleven unidirectional lines. The reference to "lines" may include conductors, couplings, connectors, matings, connections, and the like. Cell flow processor 38 also provides these same signals to background switch control module 12 through similar interconnections. Unlike line interface 39, which may vary from one I/O module to another, cell flow processor 38 has the same structure and performs the same function in all I/O modules. In a particular embodiment, cell flow processor 38 implements a core cell transfer function using ATM with virtual channel (VC) buffer and bandwidth control.

Cell flow processor 38 includes a to-switch port processor (TSPP) 28, a from-switch port processor (FSPP) 30, a serializer 32, and a deserializer 34. In a particular implementation, TSPP 28 and FSPP 30 may be implemented using an application specific integrated circuit (ASIC). Cell flow processor 38 uses TSPP 28 to receive information from line interface 39, to process the information, to provide communication signals to and from foreground switch control module 10, which exchange control information with foreground switch control module 10. TSPP 28 controls access to input buffers and to the bandwidth of foreground switch fabric controller 24 on a per connection basis. TSPP 28 requests and receives grants for switch bandwidth from foreground switch fabric controller 24. TSPP 28 also receives flow control information. FSPP 30 may also be an ASIC. The FSPP 30 controls access to output buffers and linked bandwidth on a per connection basis. FSPP 30 also sends and receives flow control information.

Serializer 32 receives the information from TSPP 28 in parallel format and converts the information to serial format and provides the information as either first I/O serial data signal 40. TSPP 28 also receives control information from foreground switch fabric controller 24. FSPP 30 receives information from foreground switch control module 10 through first I/O serial data signal 40 and first I/O serial control signal 42. Deserializer 34 receives these data signals where they are converted from serial format to parallel format and then provided to FSPP 30. TSPP 28 and FSPP 30 are in communication with one another.

In one embodiment, foreground switch control module 10 and background switch control module 12 are essentially interchangeable modules with one operating in the foreground and the other operating in the background to provide a redundant system to increase overall system availability. Thus, the following discussion of foreground switch control module 10 may apply to background switch control module 12.

Foreground switch control module 10 includes a port processor 20, a foreground switch fabric controller 24, and a foreground switch fabric 26 having input ports and output ports corresponding to each of the plurality of I/O modules. Port processor 20 is used to communicate with the TSPPs 28 and FSPPs 30 on the I/O modules in the system.

Foreground switch fabric controller 24 controls the operation of foreground switch fabric 26 by determining how the data signals provided from the plurality of I/O modules, such as first I/O serial data signal 40, are interconnected (switched) by foreground switch fabric 26. Foreground switch fabric controller 24 accumulates and arbitrates transfer requests from each I/O module. Foreground switch fabric controller 24 may also maintain and access a topology state for each connection. This topology information controls the fan-in and the fan-out of multipoint connections. In one embodiment, foreground switch fabric controller 24 may include a bandwidth arbiter (BA) ASIC to decide which I/O modules or ports have access to foreground switch fabric 26, and a multipoint topology controller (MTC) ASIC to maintain and access topology states for each connection in the digital communication switch. Foreground switch fabric controller 24 receives control signals from each of the I/O modules, such as first I/O serial control signal 42 from first I/O module 14. Foreground switch fabric controller 24 uses this information to determine which data signal from all of the I/O modules should be provided at a particular input of foreground switch fabric 26 and routed to a particular output of foreground switch fabric 26.

Once foreground switch fabric controller 24 determines which connection should be made within foreground switch fabric 26, a control signal is provided to the TSPP of the appropriate I/O module so that the correct data signal may be provided to the input port of foreground switch fabric 26 corresponding to that I/O module. For example, first I/O module 14, through TSPP 28, provides first I/O serial control signal 42 to foreground switch fabric controller 24 indicating a request for communication from first I/O module 14. Eventually, foreground switch fabric controller 24 grants the request and communicates the grant to TSPP 28 through first I/O serial control signal 42. At this time, the cell may be transferred from TSPP 28 through first I/O serial data signal 40 to foreground switch fabric 26. Foreground switch fabric 26, under the control of foreground switch fabric controller 24, maps or switches first I/O serial data signal 40 to the designated output port for receipt by the FSPP of the receiving I/O module. The data signals provided from the various I/O modules, such as first I/O serial data signal 40, may be provided as communication cells having a header portion and a data portion. These communication cells may be provided in asynchronous transfer mode (ATM) format, or the like. The information may then be processed by the line interface of the receiving I/O module and provided in the communication format of the interfacing access technology.

Background switch control module 12 receives the same signals from the I/O modules, such as I/O first module 14, that are provided to foreground switch control module 10. Background switch control module 12 operates in the same manner as foreground switch control module 10. In the event that foreground switch control module 10 fails or is taken out of service, background switch control module 12 may operate in the foreground with minimal disruption of service. In one embodiment, port processor 20 switches between foreground control module 10 and background control module 12 in response to external control. However, before taking foreground switch control module 10 out of service or before foreground switch control module 10 fails, it is important to ensure that background switch control module 12 is operating correctly so that service will not be disrupted.

Figure 2:
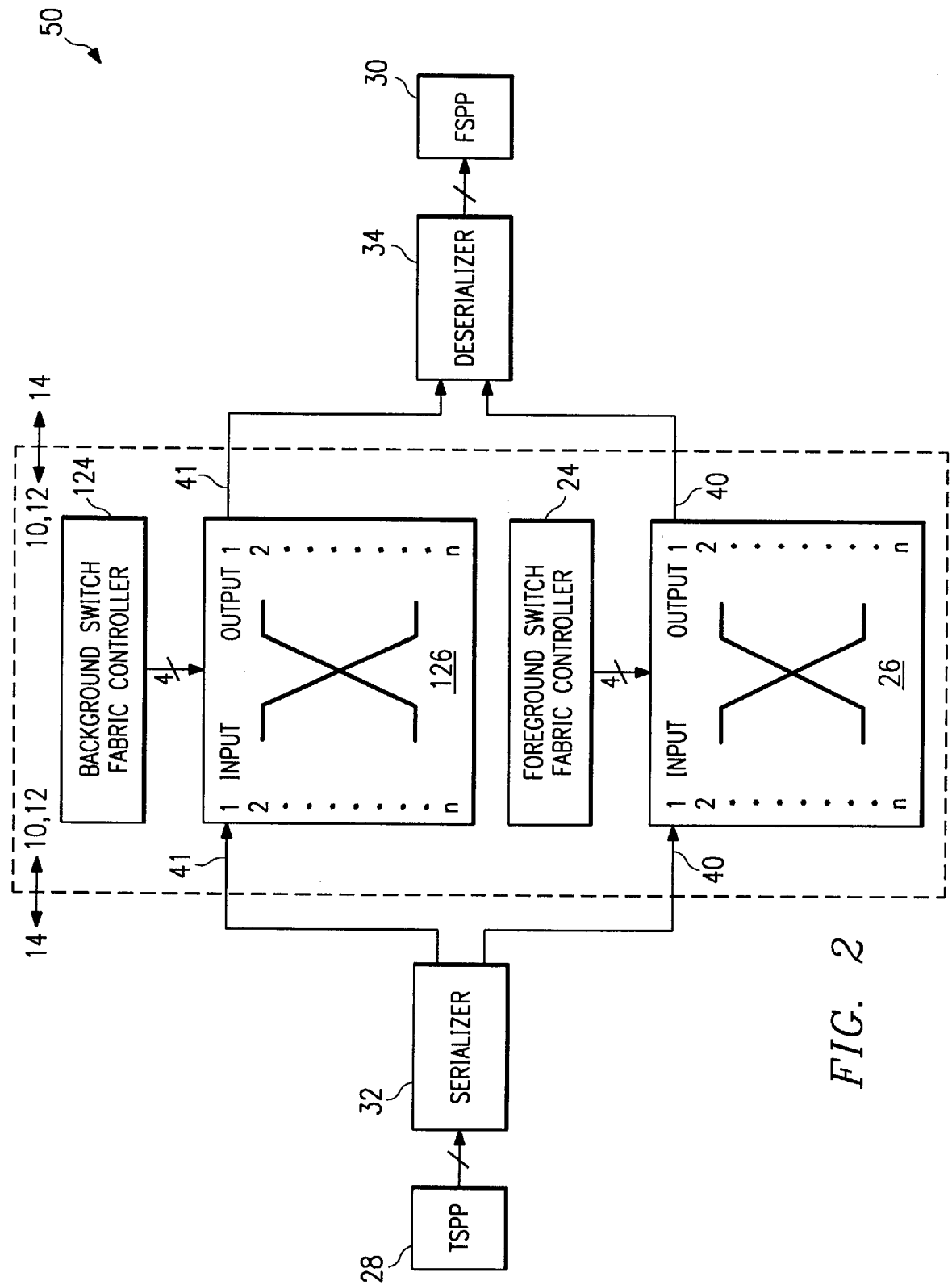
FIG. 2 is a block diagram illustrating a redundant switch system including the data interconnection between the first I/O module and the foreground switch control module and a background switch control module.

FIG. 2 is a block diagram illustrating a redundant switch system, including the data interconnection with first I/O module 14. As discussed above, when first I/O module 14 provides information to foreground switch control module 10, the information is correspondingly also provided to background switch control module 12. Background switch control module 12 includes the same or similar components as that provided in foreground switch control module 10. These same or similar components may include a background switch fabric controller 124, and a background switch fabric 126 as shown in FIG. 2. Before both foreground switch control module 10 and background switch control module 12 may both receive the same information, background switch fabric controller 124 and foreground switch fabric controller 24 must be synchronized so that these controllers stay in lock-step. This may include identically configuring control registers, and updating tables and entries. When a communication cell is provided from TSPP 28, it is provided to serializer 32 in parallel format and converted to serial format and provided to processor interface 36. In one embodiment, processor interface 36 then provides the communication cell to background switch fabric 126 through a background first I/O serial data signal 41. This same communication cell is also provided to foreground switch fabric 26 through first I/O serial data signal 40. At this time, both background switch fabric 126 and foreground switch fabric 26, under the control of their respective switch fabric controllers, map or switch the communication cell to a designated output port where the cell may then be provided to that port's I/O module for further processing. In normal operation, first I/O serial data signal 40, as provided at the output of foreground switch fabric 26, is a communication cell that is provided to the designated I/O module. However, if foreground switch control module 10 fails or is taken out of service, then background first I/O serial data signal 41, as provided at the output of background switch fabric 126, may be provided to the designated I/O module.

It is critical that the components of background switch control module 12 are operating correctly so that in the event of a failure, background switch control module 12 may be relied upon for continued operation with minimal interruption of service. Thus, it is desirous to routinely verify the operation of background switch control module 12 to ensure that it is operating correctly while minimizing or eliminating any adverse effect on overall system performance caused by the verification of the background operation. The present invention accomplishes all of this as illustrated below.

First, foreground switch fabric controller 24 determines a point in time in which unallocated bandwidth is provided in foreground switch fabric 26. During this period or slot of time, foreground switch fabric 26 may map or switch from an input port to an output port without adversely affecting the transfer of any other communication cell. In one embodiment, unallocated bandwidth may be normally provided for every input and output port of foreground switch fabric 26 once every 5 milliseconds.

During this time of unallocated bandwidth, a test cell may be sent from the TSPP of each I/O module to the corresponding input port of both the foreground switch fabric 26 and the background switch fabric 126. Both switch fabrics then switch the test cell to the output port corresponding to the I/O module that sent the test cell.

The FSPP of each I/O module then receives the same test cell from the background switch fabric 126 that was originally provided from the TSPP. The FSPP then performs error checking to determine whether an error occurred in the transmission through background switch fabric 126. This may be accomplished using parity checking or cyclic redundancy check (CRC) techniques to determine if an error occurred. CRC is an error checking procedure commonly used in data communications in which each transmitted bit is applied to a register containing a series of XOR gates, thereby solving a polynomial equation. The result of this operation is appended to the test cell and compared to an identical operation performed on the received test cell. If the values match, no error was detected. There are several standard CRC checks, including CRC-6, CRC-16, CRC-32 which is used in the IEEE 802 LAN standards.

In operation, foreground switch fabric controller 24 detects unused bandwidth in foreground switch fabric 26 and enables a switch fabric test to test the operation of background switch control module 12. At this time, foreground switch fabric controller 24 provides a control signal to the FSPP of each I/O module or to a designated I/O module indicating that a switch fabric test is to be performed. For example, FSPP 30 of first I/O module 14 receives a signal from foreground switch fabric controller 24 indicating that a switch fabric test is to be performed. In response, FSPP 30 instructs TSPP 28 to send a test cell. The test cell is provided to serializer 32 in parallel format and converted to serial format and then provided to processor interface 36. Processor interface 36 provides the test cell in serial format to background switch fabric 126 as background first I/O serial data signal 41. Background switch fabric 126 receives background first I/O serial data signal 41 and maps or switches the signal from a first input port to a corresponding first output port, under the control of background switch fabric controller 124. Background switch fabric 126 then provides the signal to processor interface 36. This signal is also referenced in FIG. 2 as background first I/O serial data signal 41. Processor interface 36 then provides the signal containing the test cell to Deserializer 34 where the signal is converted from serial format to parallel format and provided to FSPP 30.

FSPP 30 performs CRC error detection and determines whether or not an error has occurred. If an error has occurred, FSPP 30 sends a control signal to foreground switch fabric controller 24 where the error is stored or logged. In one embodiment, if an error occurs, an alarm or indicator may be enabled as a result of the error condition. After a predefined number of CRC errors, foreground switch fabric controller 24 and, in one embodiment, background switch fabric controller 124, interrupts foreground switch control module 10 and places background switch control module 12 as the primary or foreground control module.

During the time in which the switch fabric test is enabled, deserializer 34 acts as a switch fabric selector or multiplexer and provides the output of background switch fabric 126 to deserializer 34 for error processing by FSPP 30.

The switch fabric test has been described, and shown in FIG. 2, with respect to first I/O module 14. In one embodiment, every 5 milliseconds every I/O module of the digital communication switch may send a test cell through background switch fabric 126 and then back to the FSPP of the sending I/O module for error checking. The present invention provides technical advantages by testing the operation of background switch fabric 126 and background switch fabric controller 124 without adversely affecting the performance of the digital communication switch.

FIG. 3 is a flow chart illustrating a method for operating redundant switch system 50. The method begins at step 200 and proceeds to step 202 where the foreground switch fabric controller detects unallocated switch bandwidth. This may be accomplished by examining a switch allocation table and locating unallocated slots in the switch allocation table. The method proceeds next to step 204 where a switch fabric test is enabled at the point in time where unallocated switch bandwidth may be used.

Proceeding next to step 206, the foreground switch fabric controller sends a control signal to the FSPPs of each I/O module. The control signal indicates that a switch fabric test has been enabled and that a test cell should be sent from the TSPPs of each I/O module to the background switch fabric. The method proceeds next to step 208 where the FSPPs' signal their TSPP to send the test cell. The test cell may be provided in memory as part of the TSPP and may be shorter than a normal cell to prevent any clock skewing due to the high speed nature of the serial interface between the I/O modules and the switch control modules. The additional signaling needed to implement the switch fabric test may require that the test cell be one-half of a normal cell so that timing errors are not encountered.

Proceeding next to step 210, the TSPPs send the test cell to both switch fabrics where the test cell is provided at each I/O module's input port. The method then proceeds to step 212 where both switch fabrics transfer the test cell from each I/O module's input port to each I/O module's corresponding output port. The corresponding output port is the output port that corresponds to the I/O module that sent the test cell. The test cell is then provided from the background switch fabric to the FSPP of the I/O module. Deserializer 34, acting as a switch fabric selector, provides the output of the background switch fabric to the FSPP instead of the output of the foreground switch fabric.

Next, the method proceeds to step 214 where the FSPPs receive the test cell and perform error checking, such as CRC error checking, to determine if an error has occurred. If an error has occurred, the FSPP may provide a signal to the foreground switch fabric controller where the error is logged or stored in an error table. The method proceeds next to step 216 where the errors are analyzed and an appropriate action is taken. For example, after a predefined number of CRC errors have occurred, the background switch control module 12 may be transitioned from operating in the background to operating in the foreground. Optionally, an alarm or indicator may be enabled as a result of the errors. The method then concludes at step 218.

Thus, it is apparent that there has been provided, in accordance with the present invention, a redundant switch system and method of operation that satisfies the advantages set forth above. The present invention improves overall system availability while eliminating or minimizing any adverse effect on overall system operation.

Although the preferred embodiment of the present invention has been described in detail, it should be understood that various changes, substitutions, and alterations may be made to the described embodiment without departing from the spirit and scope of the present invention. The direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. A redundant switch system for use in a digital communication switch, the redundant switch system comprising:

a first switch control module having a first switch fabric and a first switch fabric controller, the first switch fabric having a plurality of input ports and a plurality of output ports and operating in the foreground under the control of the first switch fabric controller, the first switch fabric operable to contemporaneously receive communication signals at all of the plurality of input ports and to provide the communication signals to at least one of the plurality of output ports, the first switch fabric controller operable to initiate a switch fabric test;

a second switch control module having a second switch fabric and a second switch fabric controller, the second switch fabric having a plurality of input ports and a plurality of output ports and operating in the background under the control of the second switch fabric controller, the second switch fabric operable to contemporaneously receive communication signals at all of the plurality of input ports and to provide the communication signals to at least one of the plurality of output ports; and a first I/O module in communication with the first switch fabric controller, the first I/O module operable to exchange communication signals with the first switch fabric and the second switch fabric, provide a test communication signal to one of the plurality of input ports of the second switch fabric in response to the initiation of the switch fabric test by the first switch fabric controller, receive the test communication signal from one of the plurality of output ports of the second switch fabric, and generate an error signal if an error occurs when providing and receiving the test communication signal.

2. The redundant switch system of claim 1, wherein the first I/O module includes a cell flow processor operable to process asynchronous transfer mode cells.

3. The redundant switch system of claim 1, wherein the first switch fabric controller initiates the switch fabric test so that the switch fabric test occurs during a time when the bandwidth of the first switch fabric is unallocated.

4. The redundant switch system of claim 1, wherein the first I/O module is operable to provide the error signal to at least the first switch fabric controller.

5. The redundant switch system of claim 1, wherein the first switch fabric controller includes a bandwidth arbiter and a memory, the bandwidth arbiter operable to control at least the first switch fabric and determine when unallocated bandwidth is available, the memory operable to store the error signal.

6. The redundant switch system of claim 1, wherein the test communication signal is a test communication cell having a pseudo asynchronous transfer mode cell format.

7. The redundant switch system of claim 6, wherein the test communication cell is smaller in size than a normal asynchronous transfer mode cell.

8. The redundant switch system of claim 1, wherein the test communication signal is provided in an asynchronous transfer mode cell format.

9. The redundant switch system of claim 1, wherein the first I/O module generates an error signal if the test communication signal provided to one of the plurality of input ports of the second switch fabric differs from the test communication signal received from one of the plurality of output ports of the second switch fabric.

10. The redundant switch system of claim 9, wherein the first I/O module performs a cyclic redundancy check to determine if an error occurred.

11. The redundant switch system of claim 9, wherein the first I/O module generates an error signal if the test communication signal is not received by the first I/O module.

12. The redundant switch system of claim 9, wherein the first I/O module performs a checksum to determine if an error occurred.

13. The redundant switch system of claim 1, wherein the switch fabric test can be disabled.

14. The redundant switch system of claim 1, wherein the first switch fabric and the second switch fabric are emitter coupled logic cross-point devices.

15. The redundant switch system of claim 1, wherein the test communication signal is a digital test communication cell that includes a header portion and a data portion.

16. The redundant switch system of claim 3, wherein the first switch fabric controller determines the time when the bandwidth of the first switch fabric is unallocated by using a switch allocation table and locating unused switch allocation table slots.

17. The redundant switch system of claim 3, wherein the digital communication switch is a distributed asynchronous transfer mode switch.

18. The redundant switch system of claim 3, wherein the first I/O module includes a cell flow processor having a to-switch port processor and a from-switch port processor that each include a memory.

19. The redundant switch system of claim 18, wherein the from-switch port processor determines whether an error has occurred when receiving the test communication signal.

20. The redundant switch system of claim 19, wherein the cell flow processor further includes a serializer operable to provide the test communication signal to the second switch fabric, and a deserializer operable to receive the test communication signal from the second switch fabric.

21. The redundant switch system of claim 20, wherein the first I/O module includes a line interface for exchanging communication signals between the cell flow processor and a communication link, the line interface operable to convert a communication signal received from the communication link into a format compatible with the redundant switch system and to convert a communication signal received from the redundant switch system into a format compatible with the communication link.

22. An I/O module in electrical communication with a communication link and first and second switch fabric control modules, said first and second switch fabric control modules comprising respective first and second switch fabric controllers, first and second switch fabrics operating under the control of the respective controllers, and wherein each of said switch fabrics includes first and second pluralities of inputs and outputs, said I/O module for exchanging communication signals between said communication link and said switch fabric control modules, the I/O module comprising:

a cell flow processor; and a line interface operable to receive communication signals from the communication link in a first communication signal format, to convert the communications signals to a second communication signal format used by the cell flow processor, and to provide the communication signals to the cell flow processor in said second communication signal format;

said cell flow processor being operable to serialize the communications signals that are received from said line interface, to provide said serialized, converted communication signals to said first switch fabric control module and to provide a serialized test communication signal to one of said plurality of inputs of said second switch fabric in said second communication signal format, to receive the test communication signal from one of said plurality of outputs of the second switch fabric, to generate an error signal if the received test communication signal is not the same as the provided test communication signal.

23. The I/O module of claim 22 wherein the test communication signal includes a header portion and a data portion.

24. The I/O module of claim 23 wherein the test communication signal is stored locally and provided by the cell flow processor.

25. The I/O module of claim 23 wherein the test communication signal is provided in asynchronous transfer mode format.

26. The I/O module of claim 22 wherein the cell flow processor includes a to-switch port processor to provide the test communication signal and a from-switch port processor to receive the test communication signal.

27. The I/O module of claim 22 wherein the cell flow processor determines if the received test communication signal is the same as the provided test communication signal by using a cyclic redundancy check.

28. A method for operating a redundant switch system to perform a switch fabric test, the method comprising the steps of:

determining an availability of unallocated bandwidth in a first switch fabric performing foreground operations;

generating a switch fabric test enabling signal in response to available unallocated bandwidth;

providing the switch fabric test enabling signal to a cell flow processor;

providing a serialized test communication signal to an input of a second switch fabric performing background operations in response to the cell flow processor receiving the switch fabric test enabling signal;

transporting the serialized test communication signal from the input of the second switch fabric to an output of the second switch fabric;

receiving the serialized test communication signal from an output of the second switch fabric;

deserializing the serialized test communication signal; and performing error checking on the deserialized test communication signal.

29. The method of claim 28, wherein the test communication signal is a test communication cell.

30. The method of claim 28, further comprising a step of receiving the test communication signal at the cell flow processor.

31. The method of claim 30, wherein error checking is performed at the cell flow processor.

32. The method of claim 28, further comprising a step of:

generating an error signal indicating that an error occurred if the test communication signal provided to the input of the second switch fabric differs from the test communication signal received from an output of the second switch fabric.

33. The method of claim 28, further comprising the step of:

performing an action after a predefined number of errors are found.

34. The method of claim 33, wherein the action includes enabling an alarm.

35. The method of claim 28, further comprising the step of:

incrementing a memory register when an error occurs.

36. The method of claim 28, further comprising the steps of:

providing a test communication signal to every input of the second switch fabric;

receiving a corresponding test communication signal from every output of the second switch fabric; and performing error checking on every received test communication signal.

37. The method of claim 28, further comprising a step of providing unallocated bandwidth during a predefined period of time.

38. The method of claim 28, wherein the cell flow processor includes a to-switch port processor for sending the test communication signal and a from-switch port processor for receiving the test communication signal.

* * * * *

UNITED STATES PATENT AND TRADEMARK OFFICE
CERTIFICATE OF CORRECTION

PATENT NO : 5,909,427
DATED : June 1, 1999
INVENTOR(S) : Thomas A. Manning, et al.

It is certified that error appears in the above-identified patent and that said Letters Patent are hereby corrected as shown below:

Column 3, line 42, "I/o", should read --I/O--.

Signed and Sealed this

Twenty-second Day of May, 2001

Attest:

NICHOLAS P. GODICI

Attesting Officer

Acting Director of the United States Patent and Trademark Office